United States Patent
Kenkre et al.

(10) Patent No.: US 11,157,241 B2
(45) Date of Patent: Oct. 26, 2021

(54) CODELESS SPECIFICATION OF SOFTWARE AS A SERVICE INTEGRATIONS

(71) Applicant: ServiceNow, Inc., Santa Clara, CA (US)

(72) Inventors: Natasha Sandeep Kenkre, Sunnyvale, CA (US); Virendra Karappa, Santa Clara, CA (US); Prashanth Mudhelli, Santa Clara, CA (US); Rajat Jain, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 162 days.

(21) Appl. No.: 16/575,052

(22) Filed: Sep. 18, 2019

(65) Prior Publication Data

US 2021/0081179 A1 Mar. 18, 2021

(51) Int. Cl.
| | |
|---|---|
| *G06F 8/10* | (2018.01) |
| *G06F 9/451* | (2018.01) |
| *G06F 16/22* | (2019.01) |
| *G06F 8/77* | (2018.01) |
| *G06F 9/54* | (2006.01) |
| *H04L 29/06* | (2006.01) |

(52) U.S. Cl.
CPC .............. *G06F 8/10* (2013.01); *G06F 8/77* (2013.01); *G06F 9/451* (2018.02); *G06F 9/547* (2013.01); *G06F 16/2282* (2019.01); *H04L 63/08* (2013.01)

(58) Field of Classification Search
CPC ........ G06F 8/10; G06F 9/451; G06F 16/2282; G06F 8/77; G06F 9/457; H04L 63/08
See application file for complete search history.

(56) References Cited

U.S. PATENT DOCUMENTS

| | | | |
|---|---|---|---|
| 5,978,594 A | * | 11/1999 | Bonnell ............ G06F 9/50 710/17 |
| 6,321,229 B1 | | 11/2001 | Goldman |
| 6,609,122 B1 | | 8/2003 | Ensor |
| 6,678,887 B1 | | 1/2004 | Hallman |

(Continued)

OTHER PUBLICATIONS

International Search Report & Written Opinion for PCT Application No. PCT/US2020/050861 dated Dec. 21, 2020; 13 pgs.

*Primary Examiner* — Douglas M Slachta
(74) *Attorney, Agent, or Firm* — Fletcher Yoder PC

(57) ABSTRACT

A computational instance may include, in database tables, representations of computing services provided by remote networks. One or more processors disposed in the computational instance may cause a computing-service-neutral cloud integration application to perform operations including: obtaining a specification related to a remote network, where the specification defines: (i) an integration point for the remote network, (ii) a pagination type associated with the integration point, and (iii) mappings between descriptions of the computing services provided by the remote network and fields of the database tables. The operations may further include requesting and receiving, via the integration point, first descriptions of the computing services; determining, from the pagination type and the integration point, a second integration point for the remote network; requesting and receiving, via the second integration point, second descriptions; and storing, in the database tables, the first descriptions and the second descriptions in accordance with the mappings.

20 Claims, 15 Drawing Sheets

(56) References Cited

U.S. PATENT DOCUMENTS

| | | | |
|---|---|---|---|
| 6,990,513 B2 * | 1/2006 | Belfiore | G06F 9/54 709/203 |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,818,324 B1 * | 10/2010 | Held | G06F 16/951 707/741 |
| 7,890,802 B2 | 2/2011 | Gerber | |
| 7,925,981 B2 | 4/2011 | Pourheidar | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 * | 2/2014 | Myers | G06F 21/105 726/26 |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,098,322 B2 | 8/2015 | Apte | |
| 9,122,552 B2 * | 9/2015 | Whitney | G06F 8/61 |
| 9,239,857 B2 | 1/2016 | Trinon | |
| 9,317,327 B2 | 4/2016 | Apte | |
| 9,363,252 B2 | 6/2016 | Meuller | |
| 9,454,526 B1 * | 9/2016 | Kapoor | G06F 16/24564 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,044,566 B1 * | 8/2018 | Grisco | H04L 41/0866 |
| 10,425,292 B1 * | 9/2019 | Biran | G06F 9/547 |
| 10,719,503 B1 * | 7/2020 | Bar Oz | G06F 16/215 |
| 2009/0210781 A1 | 8/2009 | Hagerott | G06F 9/451 715/234 |
| 2010/0332615 A1 * | 12/2010 | Short | H04L 12/14 709/217 |
| 2012/0005262 A1 | 1/2012 | McWhirter | |
| 2012/0290726 A1 | 11/2012 | Brown et al. | |
| 2013/0304770 A1 * | 11/2013 | Boero | G06F 16/2228 707/812 |
| 2015/0229638 A1 * | 8/2015 | Loo | H04L 67/02 726/9 |
| 2016/0103799 A1 * | 4/2016 | Wu | G06F 16/95 715/251 |
| 2016/0358354 A1 | 12/2016 | Alli et al. | |
| 2017/0315683 A1 * | 11/2017 | Boucher | G06F 3/0482 |
| 2019/0102440 A1 * | 4/2019 | Tabak | G06F 9/461 |
| 2020/0314191 A1 * | 10/2020 | Madhavan | H04L 41/0266 |

* cited by examiner

```
┌─────────────────────────────────────────────────────────────┐
│ OBTAIN, BY A COMPUTING-SERVICE-NEUTRAL CLOUD INTEGRATION    │
│ APPLICATION, A SPECIFICATION RELATED TO A REMOTE NETWORK,   │
│ WHEREIN THE COMPUTING-SERVICE-NEUTRAL CLOUD INTEGRATION     │
│ APPLICATION IS EXECUTABLE ON ONE OR MORE PROCESSORS         │
│ DISPOSED WITHIN A COMPUTATIONAL INSTANCE, WHEREIN THE       │
│ COMPUTATIONAL INSTANCE IS DEDICATED TO A MANAGED NETWORK,   │ ← 1100
│ WHEREIN PERSISTENT STORAGE DISPOSED WITHIN THE              │
│ COMPUTATIONAL INSTANCE CONTAINS, IN DATABASE TABLES,        │
│ REPRESENTATIONS OF COMPUTING SERVICES PROVIDED BY REMOTE    │
│ NETWORKS, AND WHEREIN THE SPECIFICATION DEFINES: (I) AN     │
│ INTEGRATION POINT FOR THE REMOTE NETWORK, (II) A PAGINATION │
│ TYPE ASSOCIATED WITH RESPONSES PROVIDED BY THE INTEGRATION  │
│ POINT, AND (III) MAPPINGS BETWEEN DESCRIPTIONS OF THE       │
│ COMPUTING SERVICES PROVIDED BY THE REMOTE NETWORK THAT      │
│ APPEAR IN THE RESPONSES AND FIELDS OF THE DATABASE TABLES   │
└─────────────────────────────────────────────────────────────┘
```

REQUEST AND RECEIVE, BY THE COMPUTING-SERVICE-NEUTRAL CLOUD INTEGRATION APPLICATION AND VIA THE INTEGRATION POINT, FIRST DESCRIPTIONS OF THE COMPUTING SERVICES PROVIDED BY THE REMOTE NETWORK ← 1110

DETERMINE, BY THE COMPUTING-SERVICE-NEUTRAL CLOUD INTEGRATION APPLICATION AND FROM THE PAGINATION TYPE AND THE INTEGRATION POINT, A SECOND INTEGRATION POINT FOR THE REMOTE NETWORK ← 1120

REQUEST AND RECEIVE, BY THE COMPUTING-SERVICE-NEUTRAL CLOUD INTEGRATION APPLICATION AND VIA THE SECOND INTEGRATION POINT, SECOND DESCRIPTIONS OF THE COMPUTING SERVICES PROVIDED BY THE REMOTE NETWORK ← 1130

STORE, BY THE COMPUTING-SERVICE-NEUTRAL CLOUD INTEGRATION APPLICATION AND IN THE FIELDS OF THE DATABASE TABLES, THE FIRST DESCRIPTIONS AND THE SECOND DESCRIPTIONS IN ACCORDANCE WITH THE MAPPINGS. ← 1140

FIG. 11

CODELESS SPECIFICATION OF SOFTWARE AS A SERVICE INTEGRATIONS

BACKGROUND

Cloud computing providers can make computing services (e.g., databases, virtual machines, software applications, and/or other services) remotely available to users statically or on demand. Typically, these computing services can be accessed via an integration point offered by the cloud computing providers. Interaction between users and the integration point may occur by way of the Internet.

An example user can be an enterprise. The enterprise may use computing services to support operations such as file sharing, workflow management, database planning, and so on. By using the computing services of cloud computing providers, the enterprise can avoid or reduce costs associated with developing and/or maintaining the computing services. Further, as needs of the enterprise change, the enterprise can utilize new computing services or different computing services offered by cloud computing providers to support additional operations.

SUMMARY

A managed network may use various computing services to support its operations. Sometimes, these computing services are offered by cloud computing providers in the form a "Software as a Service" (otherwise known as "SaaS"). Under the SaaS paradigm, cloud computing providers supply the hardware/software necessary to execute computing services and then expose an integration point, such an Application Programming Interface (API) endpoint, through which the managed network can remotely access the computing services.

A managed network may use hundreds, if not thousands of computing services offered by cloud computing providers. Consequently, it may be of interest for the managed network to monitor the consumption of these computing services. A remote network management platform may be particularly suited this task because it may already be configured to gather information about computing services operating within the managed network. To acquire cloud computing service consumption information, the remote network management platform may request, via an integration point provided by the cloud computing provider, consumption information for a particular computing service. Upon receiving a response, the remote network management platform may store the consumption information in a database. This information may then be used as the basis of information technology service and operations management, software asset management, and/or a variety of other network services and operations.

Yet, configuring the remote network management platform to interact with a new computing service may be challenging. Since computing services often have distinct configuration details, adding support for a new computing service can involve a team of application developers creating custom software that incorporates these distinct configuration details into the remote network management platform. This may take weeks or even months, as the development process may involve rigorous integration testing. And if the remote network management platform is to interact with several new computing services, the process can be unduly time consuming.

The present disclosure provides an improvement to a remote network management platform that can address these and other issues. In particular, a remote network management platform may include a computing-service-neutral (CSN) cloud integration application that allows remote network management platform to easily integrate with computing services offered by cloud computing providers. During execution, the CSN cloud integration application can be populated with data from a specification provided by the managed network or another service. Such data can include distinct configuration details for one or more computing services. Advantageously, if the managed network were to integrate a new computing service, no additional software updates to the remote network management platform may be necessary. Rather, the managed network may simply update the specification, for example via a graphical user interface (GUI), and the CSN cloud integration application can be restructured accordingly. Using this framework, support for integrating new computing services can be rapidly added to a remote network management platform, allowing an enterprise to quickly monitor the operations provided by these new computing services. Other advantages are also possible.

Accordingly, a first example embodiment may involve a computational instance dedicated to a managed network. The computational instance may include persistent storage, the persistent storage containing, in database tables, representations of computing services provided by remote networks. The computational instance may further include one or more processors that are configured to cause a computing-service-neutral cloud integration application to perform operations. The operations may involve obtaining a specification related to a remote network, where the specification defines: (i) an integration point for the remote network, (ii) a pagination type associated with responses provided by the integration point, and (iii) mappings between descriptions of the computing services provided by the remote network that appear in the responses and fields of the database tables. The operations may further involve requesting and receiving, via the integration point, first descriptions of the computing services provided by the remote network. The operations may further involve determining, from the pagination type and the integration point, a second integration point for the remote network. The operations may further involve requesting and receiving, via the second integration point, second descriptions of the computing services provided by the remote network. The operations may further involve storing, in the fields of the database tables, the first descriptions and the second descriptions in accordance with the mappings.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 11 is a flow chart, in accordance with example embodiments.

DETAILED DESCRIPTION

Figure 1:
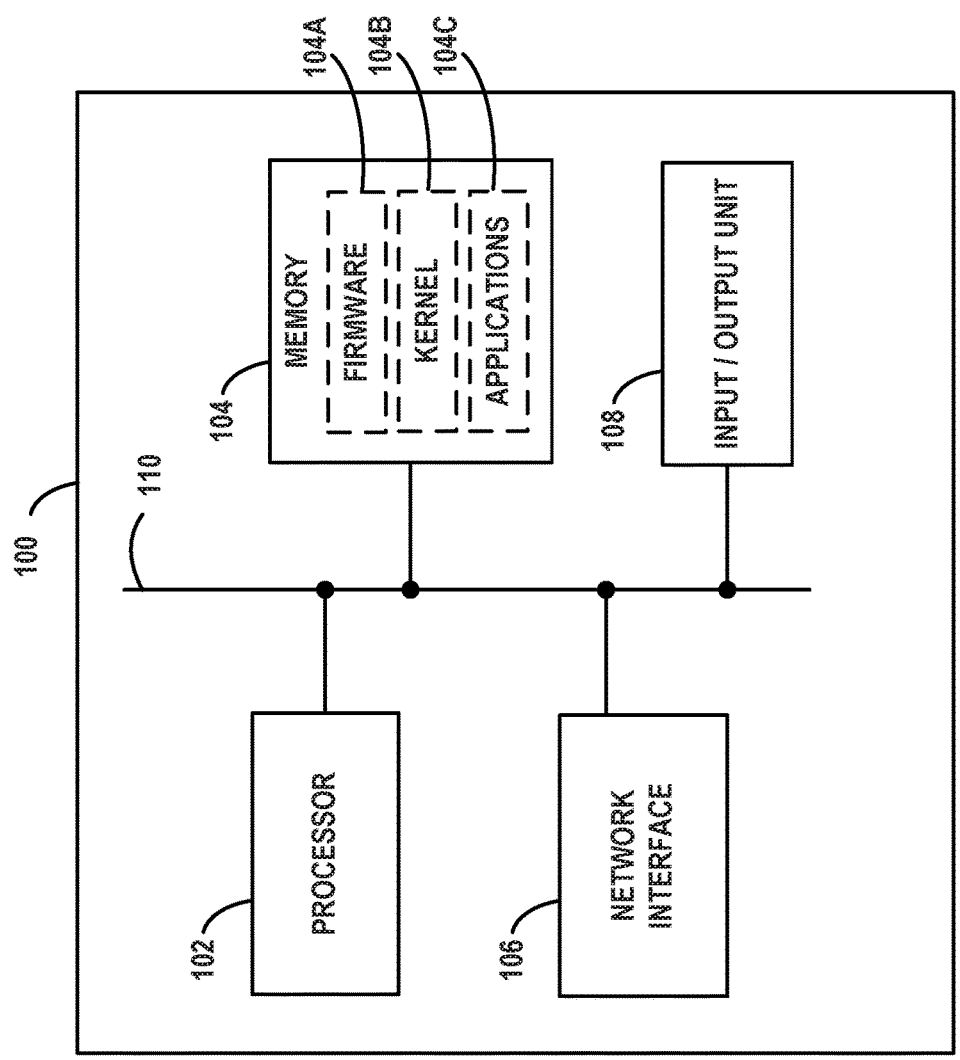
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
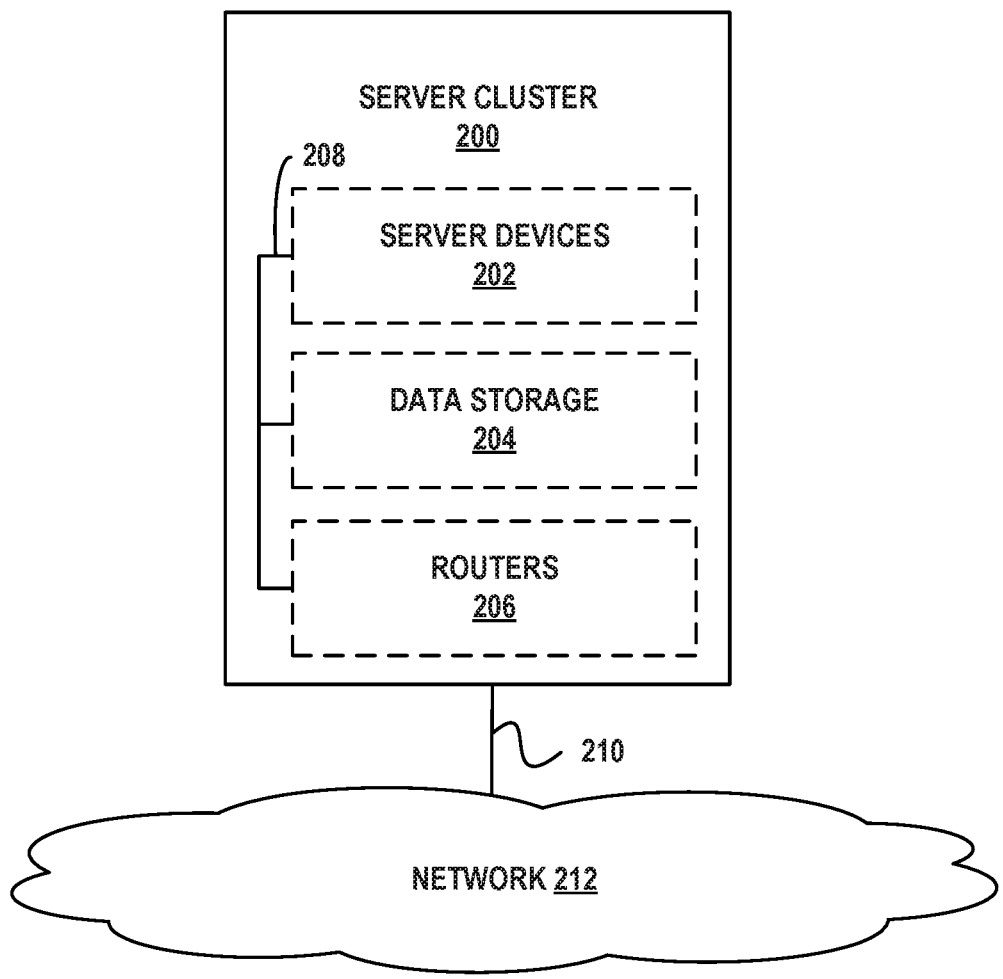
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
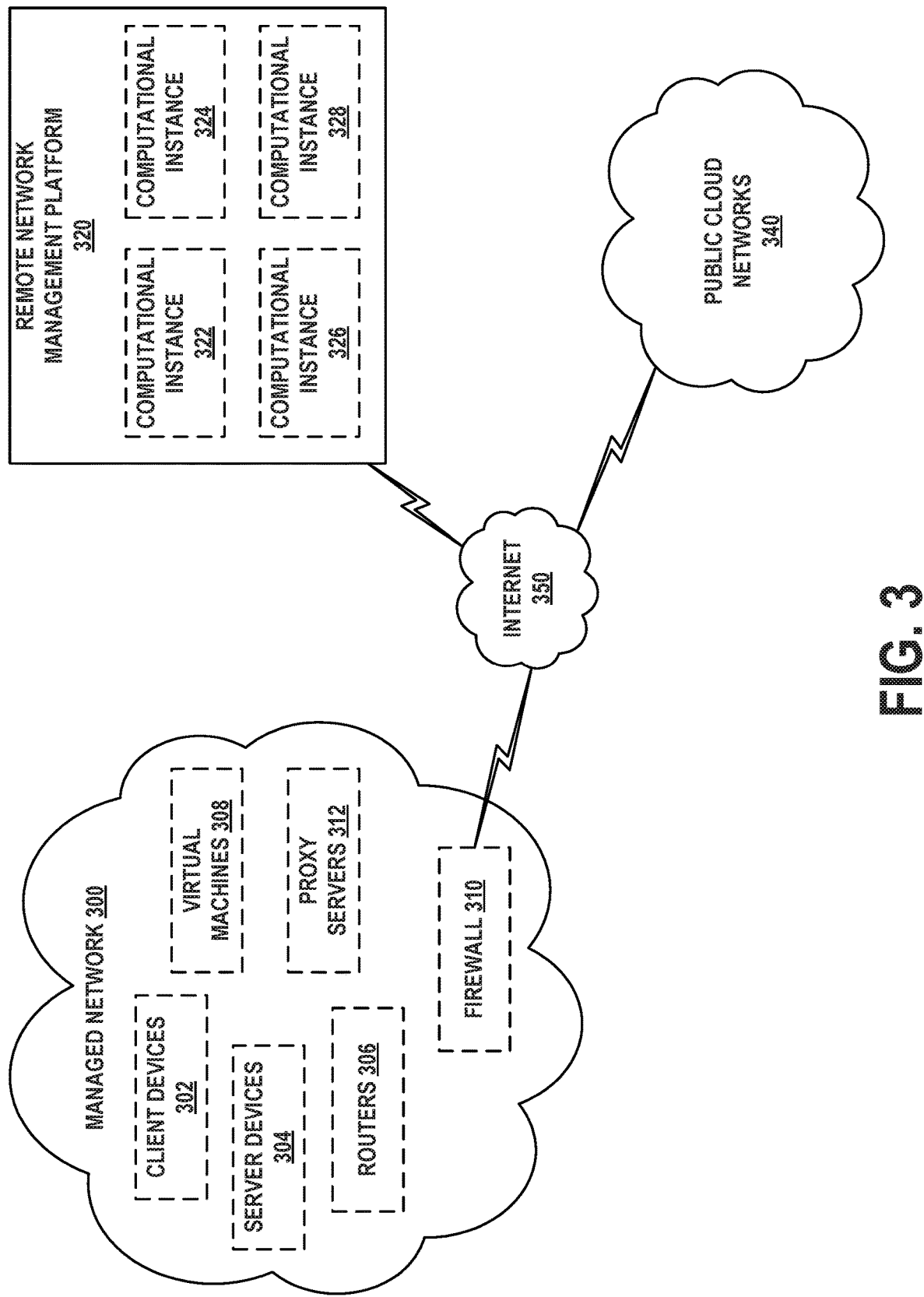
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
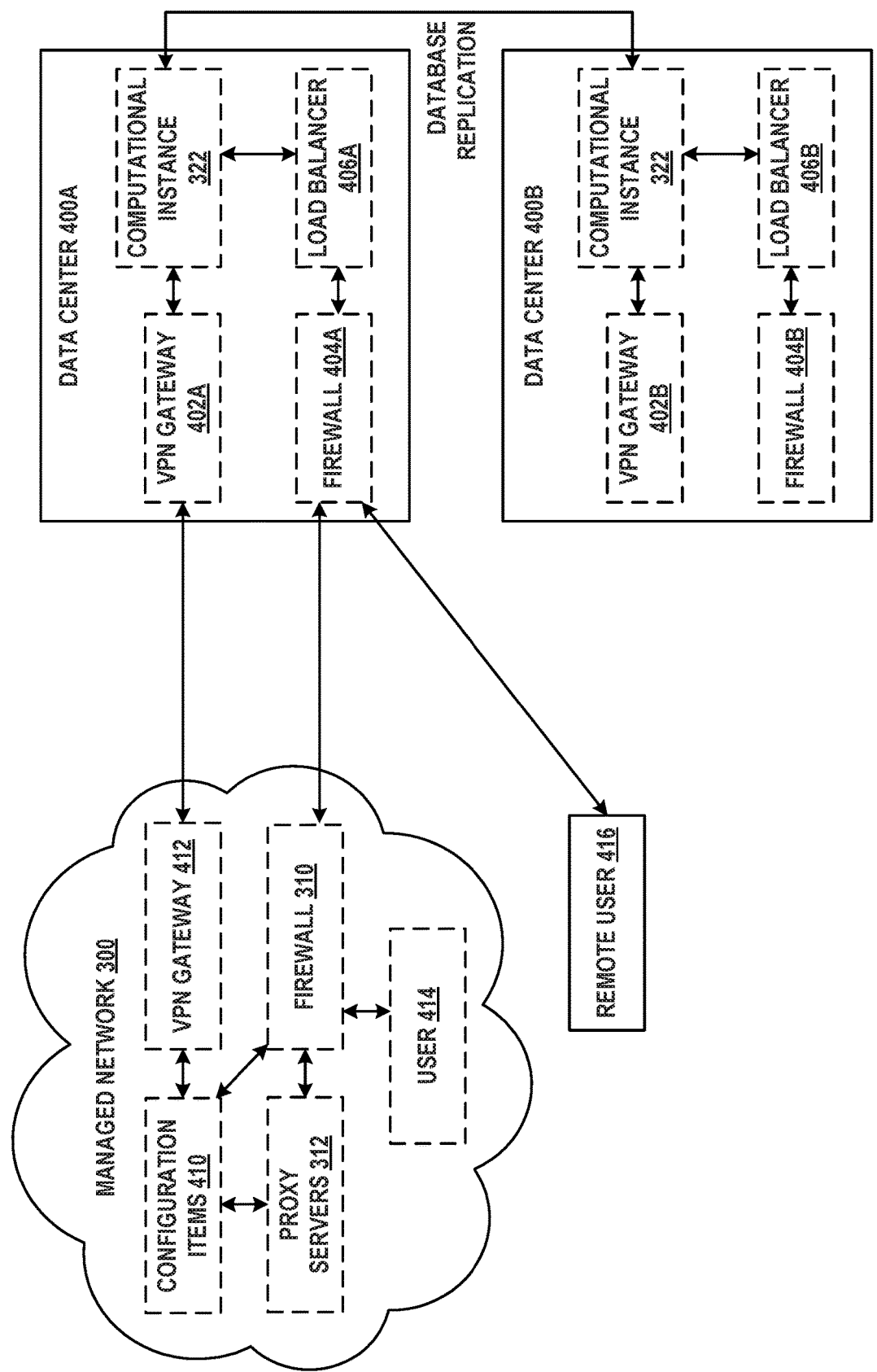
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
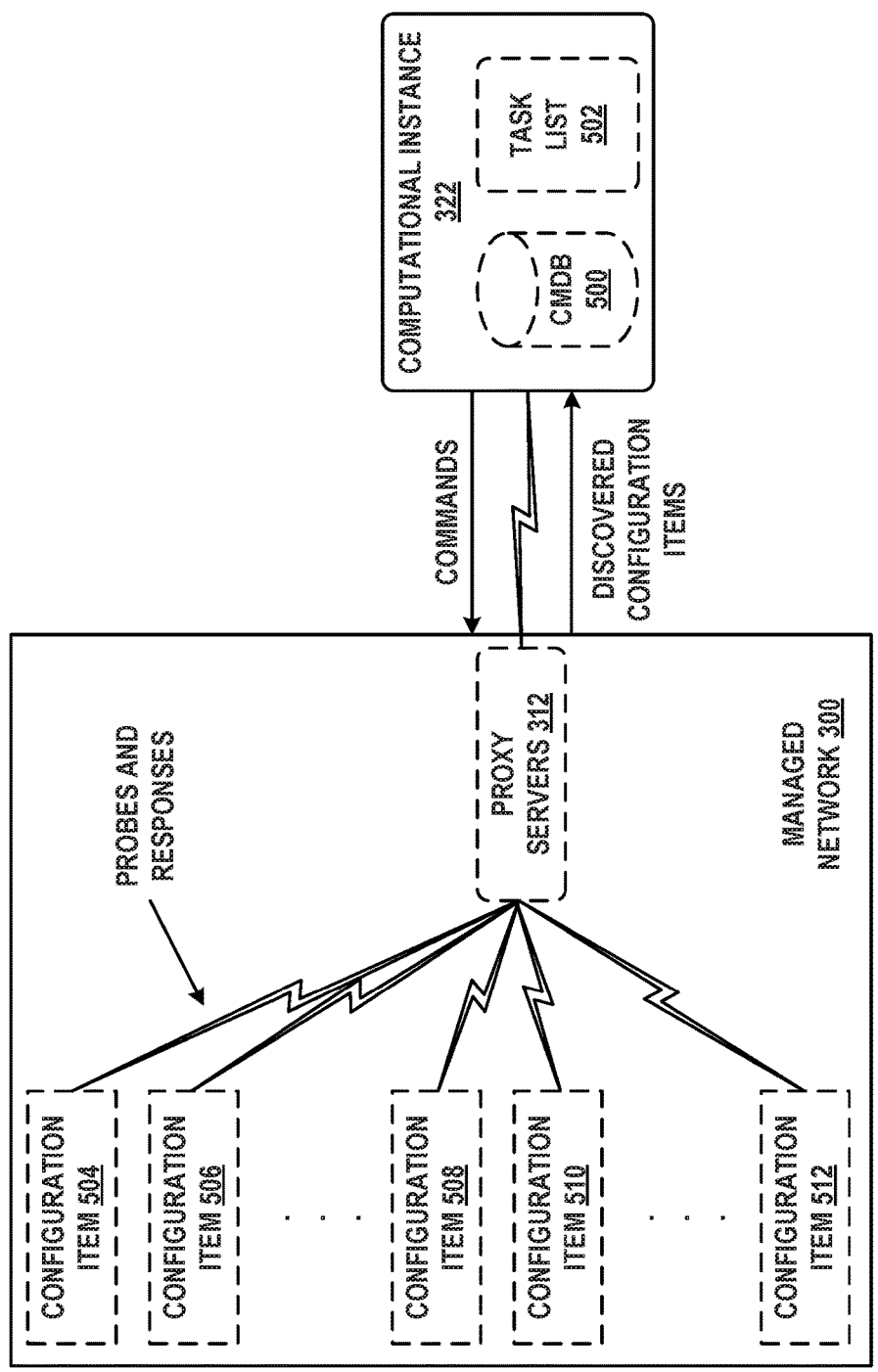
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
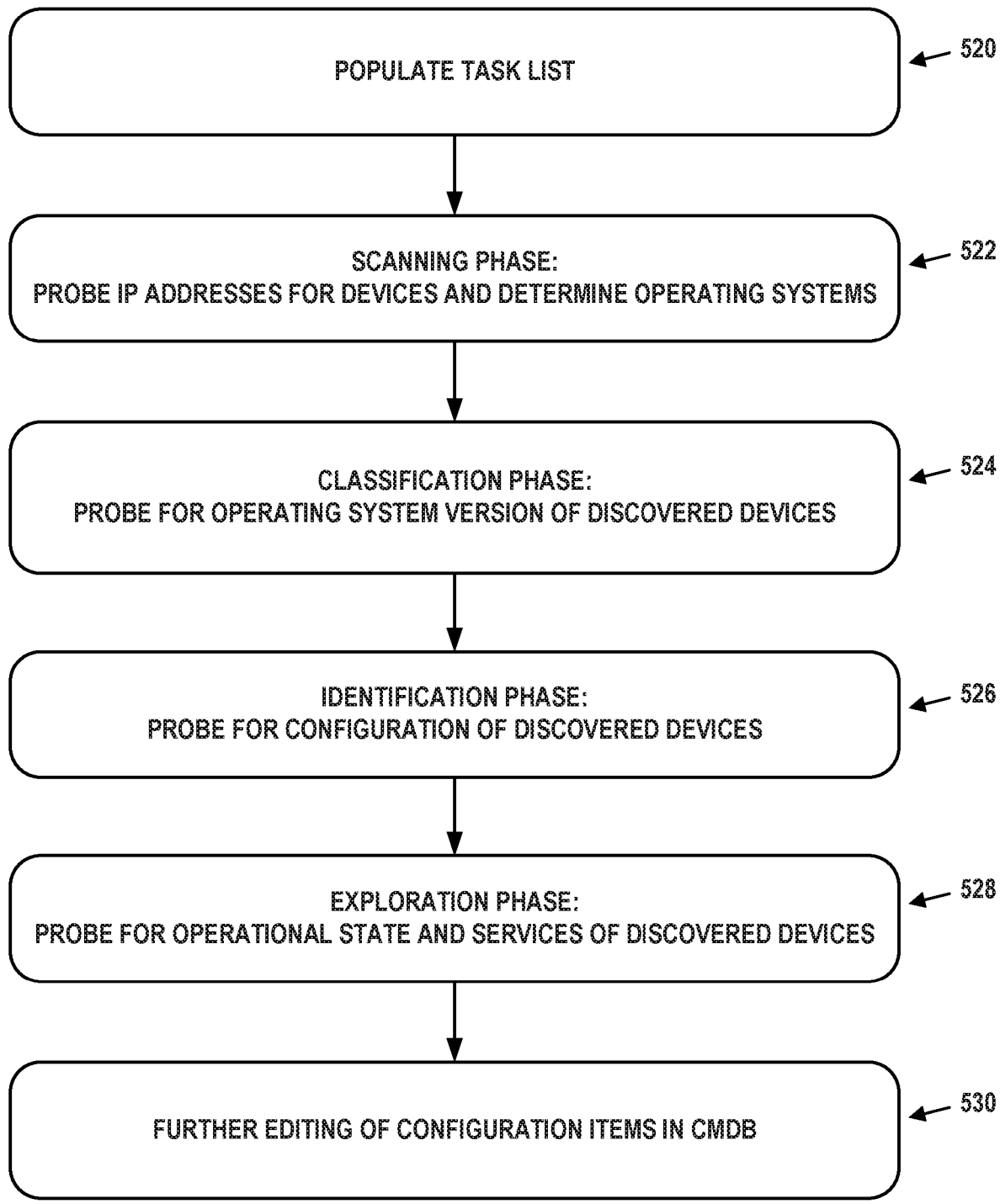
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE CLOUD BASED COMPUTING SERVICES

As previously noted, cloud computing providers can make computing services (e.g., databases, virtual machines, software applications, and/or other services) remotely available to users statically or on demand. These computing services may include online data storage services, document collaboration services, virtual machine services, web hosting services and more. Because the cloud computing provider supplies the hardware and software necessary for the computing service, a managed network may not have to devote time to provision or deploy its own infrastructure to manage the computing service.

Cloud computing providers were discussed above in the context of public cloud networks 340. Thus, examples of cloud computing providers (which herein can be referred to as "remote networks") may include AMAZON WEB SERVICES®, MICROSOFT® AZURE®, IBM CLOUD®, DROPBOX®, and SLACK TECHNOLOGIES®. Examples of computing services made available by these cloud computing providers may include AMAZON AURORA® (a relational database management service), AZURE® Blob Storage (an unstructured data storage service), and SLACK® (a collaborative messaging service). Other cloud computing providers and computing services may exist.

To keep up with increased demand for additional operations, cloud computing providers may regularly update their computing service offerings. That is, a cloud computing provider may develop new computing services, adjust older computing services, and/or remove outdated computing services. Such updates may occur every week, every few months, or every year. Additionally, new cloud computing providers may be established, each offering different sets of new computing services.

It may be advantageous for managed network 300 to be able to utilize the functionality provided by new computing services and/or new cloud computing providers. Further, it may be advantageous for managed network 300 to monitor the consumption of these new computing services so as to gain greater context into information technology service and operations management, software asset management, and/or a variety of other network services and operations. Moreover, an entity operating remote network management platform 320 may find it desirable to interact with these new computing services and/or new cloud computing providers on behalf of managed network 300.

Yet, configuring remote network management platform 320 to interact with a new computing service may be challenging. Since computing services often have distinct configuration details, adding support for a new computing service can involve a team of application developers creating custom software that incorporates these distinct configuration details into remote network management platform 320. This may take weeks or even months, as the development process may involve rigorous integration testing. And if remote network management platform 320 is to interact with multiple new computing services, the process can be unduly time consuming.

To address this or other issues, the entity operating remote network management platform 320 may provide a cloud integration application to quickly integrate with new computing services and/or new cloud computing providers. Advantageously, such a cloud integration application may be configurable via a specification provided by managed network 300, removing the need for custom software to be developed. Once configured, the cloud integration application may enable remote network management platform 320 to interact with/obtain consumption information for new computing services and/or cloud computing providers. Obtained consumption information may then be populated in CMDB 500 or another database on remote network management platform 320 for later analysis.

By using the embodiments herein to interact with computing services, the cloud integration application may be considered "computing-service-neutral" (shortened to CSN herein). This is because the cloud integration application includes no specific configuration details on computing services and/or cloud computing providers, but rather obtains these details from managed network 300 or another entity when the cloud integration application is executed. Because of this characteristic, the cloud integration application may also be referred to as a "computing-service-neutral (CSN) cloud integration application."

Figure 6:
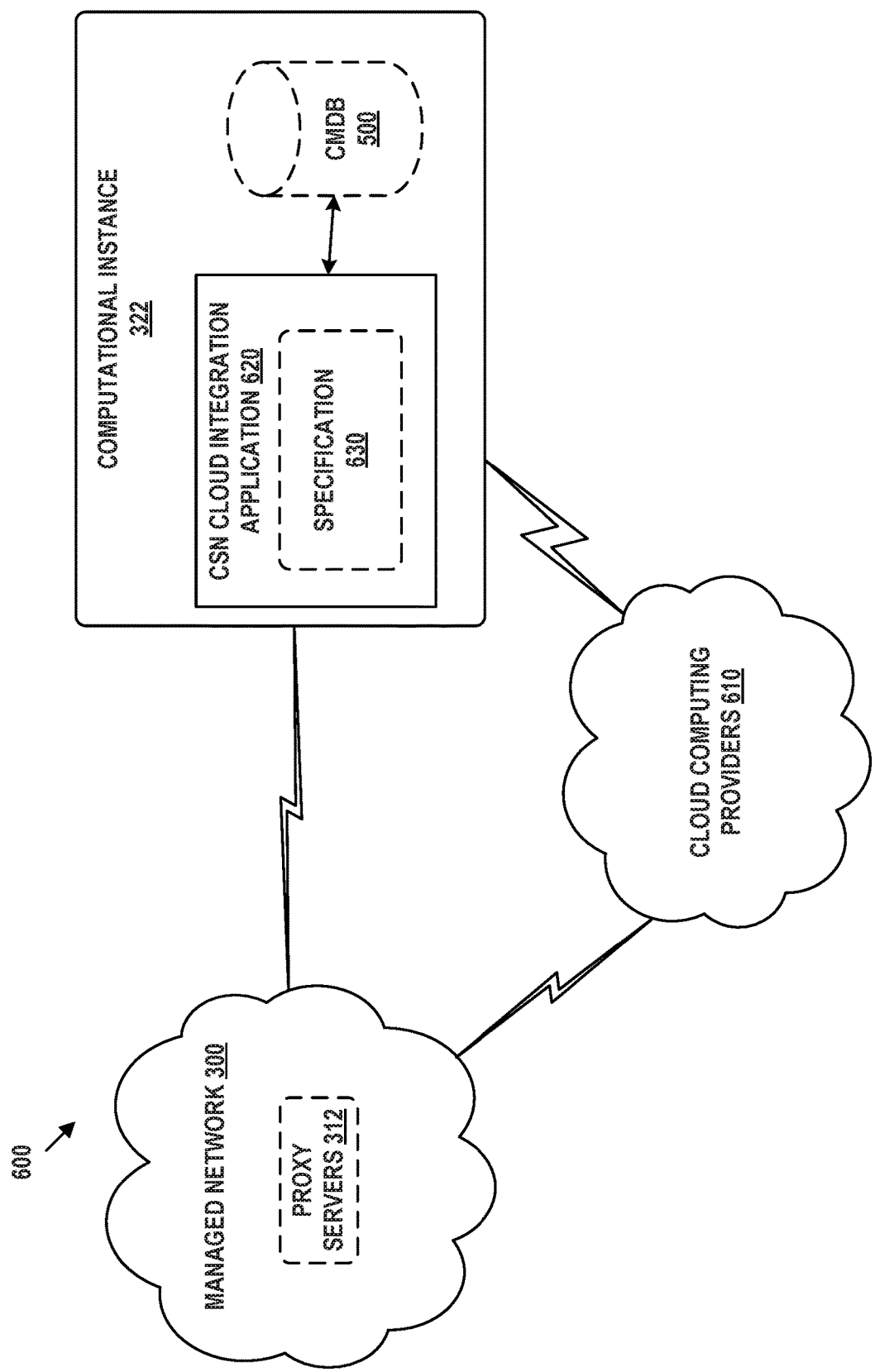
FIG. 6 illustrates a network architecture, in accordance with example embodiments.

FIG. 6 depicts network architecture 600, in accordance with example embodiments. Network architecture 600 includes three main components, managed network 300, computational instance 322, and cloud computing providers 610, all communicatively connected by way of a network, such as Internet 350. As noted above, cloud computing providers 610 may take on some or all of the properties discussed for public cloud network 340.

Computational instance 322 may be disposed within remote network management platform 320 and may be dedicated to managed network 300. Computational instance 322 may store discovered configuration items that represent the environment of managed network 300 in CMDB 500. Additionally, computational instance 322 may include computing-service-neutral (CSN) cloud integration application 620, which is used to integrate computational instance 322 with computing services offered by cloud computing providers 610. Upon integration, computational instance 322 may obtain consumption information, including usage, performance, and billing statistics, of computing services offered by cloud computing providers 610.

Managed network 300 may be an enterprise network used by an entity for computing and communications tasks, as well as storage of data. In examples, managed network 300 may be a subscriber to one or more of computing services offered by cloud computing providers 610. These may include computational, data storage, communication, and/or hosting services. For instance, if managed network 300 provides online music streaming services, a computing service that stores music files may be used. Managed network 300 may include one or more proxy servers 312. Possibly with the assistance of proxy servers 312, computational instance 322 may be able to integrate with computing services offered by cloud computing providers 610 that are used by managed network 300.

To make use of computing services offered by cloud computing providers 610, managed network 300 may first establish an account with each of cloud computing providers 610 for which one or more of computing services are requested. After establishing the accounts, managed network 300 may specify a subset of computing services with which it would like CSN cloud integration application 620 to integrate. For instance, managed network 300 may be interested in integrating with only database services associated with these accounts. To do this, managed network 300 may provide CSN cloud integration application 620 with specification 630.

Specification 630 may be a file, database table(s), or set of associations that includes account information details (e.g., passwords, usernames) and access details for computing services offered by cloud computing providers 610. For instance, given that a computing service may be accessed through an integration point, such as an API endpoint, specification 630 may contain a list of API endpoints for computing services. In examples, these API endpoints may include representational state transfer (REST) APIs, Simple Object Access Protocol (SOAP) APIs, GraphQL APIs, or other types of APIs architectures. CSN cloud integration application 620 may query these API endpoints over Hyptertext Transfer Protocol Secure (HTTPS), Hyptertext Transfer Protocol (HTTP), or other application layer protocols. Additionally, specification 630 may include one or more mappings between descriptions of the computing services received from cloud computing providers 610 and configuration items in CMDB 500. These mappings may be used to ensure that descriptions (e.g., consumption information) received from cloud computing providers 610 are correctly stored in specific fields and tables in CMDB 500 or another database. In example embodiments, the descriptions of computing services may be in XML, JavaScript Object Notation (JSON), or YAML Ain't Markup Language (YAML) format.

Once provided with specification 630, CSN cloud integration application 620 may begin to interact with computing services offered by cloud computing providers 610. Advantageously, if managed network 300 were to start using a new computing service offered by cloud computing providers 610, no additional software updates to computational instance 322 or CSN cloud integration application 620 may be necessary. Rather, managed network 300 may simply update specification 630 (e.g., by way of a GUI) and CSN cloud integration application 620 may be configured accordingly.

Occasionally, cloud computing providers 610 split the descriptions of a computing service across multiple integration points. That is, instead of providing a description via a single integration point (e.g., a single API endpoint), a cloud computing provider may divide the description across multiple integration points (e.g., multiple API endpoints), each of which is known a "page". This technique is common if the description of the computing service is unduly large. Thus, to obtain the entire description of the computing service, requests should be made to each of the multiple integration points (e.g, each of the pages).

To integrate with a computing service that has its descriptions split across multiple integration points, specification 630 may include a "pagination type". In particular, a user can provide specification 630 with a first integration point and the pagination type. Upon receiving specification 630, CSN cloud integration application 620 can use the pagination type to modify the first integration point into subsequent integration points. Then, CSN cloud integration application 620 can make requests to each of these subsequent integration points to obtain a complete description of the computing service.

Figure 7:
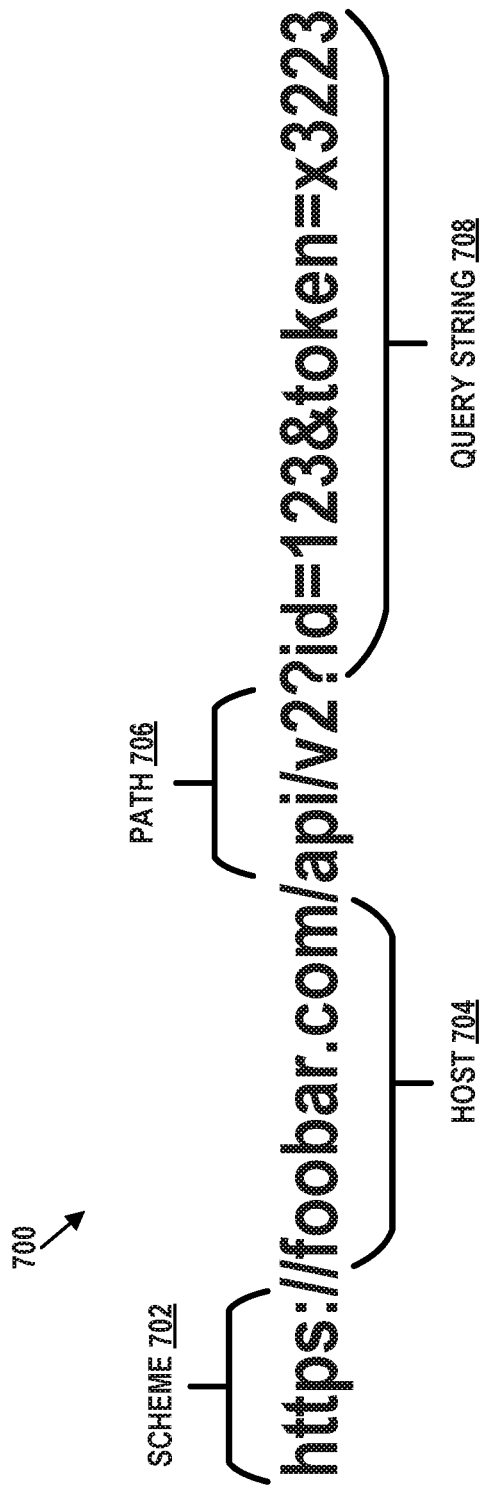
FIG. 7 depicts a uniform resource locator (URL), in accordance with example embodiments.

To conceptually illustrate the idea of pagination types, FIG. 7 depicts URL 700. As shown, URL 700 consists of scheme 702, host 704, path 706, and query string 708.

Scheme 702 identifies a protocol to be used to access a computing service. In URL 700, scheme 702 shows that the HTTPS protocol is used, but other protocols, such as HTTP, are also possible.

Host 704 identifies the name of a server device that provides the computing service. In URL 700, host 704 shows that "foobar.com" is the host, but other hosts are also possible.

Path 706 identifies a path on the server device to where the computing service is located. In URL 700, path 706 shows that "/api/v2" is the path, but other paths are also possible.

Query string 708 is an optional string that follows path 706. Query string 708 provides a string of information that the computing resource can use for some purpose. For example, query string 708 may contain parameters that the computing resource uses for a search. Query string 708 is configured as a string of name/value pairs, each separated by an ampersand. In URL 700, query string 708 shows that "id=123&token=3223" is the query string, but other query strings are also possible.

Now back to pagination types: given that integration points can take the form of URLs, a pagination type generally modifies either the path or query string of an initial URL to obtain subsequent URLs.

Different pagination types may be used depending on how a particular cloud computing provider arranges its descriptions of computing services. For example, cloud computing provider A_1 may divide descriptions into 500 item pages, while cloud computing provider B_1 may divide descriptions into 1000 item pages. To support a wide variety of arrangements, CSN cloud integration application 620 may support next endpoint pagination, next link pagination, offset pagination, and page-based paginations, among other possibilities.

When using a next endpoint pagination type, a user from managed network 300 provides specification 630 with a new path. To obtain subsequent integration points, CSN cloud integration application 620 would modify the path of an initial integration point with the new path. For example, if an initial integration point is "https://foobar.com/api/v2", a second integration point may take the form of "https://foobar.com/api/v3."

When using the next link pagination type, a user from managed network 300 may provide specification 630 with a new query string. To obtain subsequent integration points, CSN cloud integration application 620 would modify the query string of an initial integration point with the new query string. For example, if an initial integration point is "https://foobar.com/api/v2?link=1", a second integration point may take the form of "https://foobar.com/api/v2?link=2".

In some embodiments, the new query string for the next link pagination type may be determined based on descriptions provided via the initial integration point. For example, upon CSN cloud integration application 620 requesting descriptions from "https://foobar.com/api/v2?link=A24", a corresponding response may appear as the following Javascript Object Notation (JSON) object:

```
{
    "ID": 1,
    "nextLink": "B53"
}
```

In this scenario, CSN cloud integration application 620 may parse the response to obtain the value of the nextLink key ("B53" in this example) and may use this value to obtain a second integration point ("https://foobar.com/api/v2?link=B53"). Subsequently, the response provided by the second integration point may provide a value that can be used to obtain a third integration point, and so on.

When using the offset pagination type, a user from managed network 300 may provide specification 630 with a size parameter and an offset parameter. Generally speaking, the size parameter indicates the number of items to be returned on a page, while the offset parameter refers to index of a particular item. For example, suppose that "https://foobar.com/api/v2" contains 100 items. Then, the query "https://foobar.com/api/v2?offset=0&size=25" would return items 1-25, the query "https://foobar.com/api/v2?offset=25&size=25" would return items 25-50, and so on.

Consequently, CSN cloud integration application 620 may be configured to modify the query string of an initial integration point with the offset/size parameters path provided in specification 630. For example, if the initial integration point is "https://foobar.com/api/v2?offset={X}&size={Y}" a second integration point may appear as "https://foobar.com/api/v2?offset={X+Y}&size={Y}", where X and Y are integers (note that the brackets { } are used as placeholders and are not intended as part of the URL).

When using the page-based pagination type, a user from managed network 300 may provide specification 630 with a page parameter. Generally speaking, the page parameter indicates an index number of a page. This may be useful if a cloud computing provider divides a description of a computing service across incrementally increasing pages. For example, a cloud computing provider may divide a description of a computing service across 10 incrementally increasing pages, the first page being "https://foobar.com/api/v2?page=1", the second page being "https://foobar.com/api/v2?page=2, and so on.

Consequently, CSN cloud integration application 620 may be configured to modify the query string of an initial integration point with the page parameter path. For example, if the initial integration point is "https://foobar.com/api/v2?page={Y}" a second integration point may appear as "https://foobar.com/api/v2?page={Y+1}", where Y is an integer (note that the brackets { } are used as placeholders and are not part of the URL string).

Notably the example pagination types above are not intended to be limiting. Other pagination types may exist and may be supported by CSN cloud integration application 620.

Occasionally, managed network 300 may use descriptions received from first integration point as input into one or more subsequent integration points. As an example of this, suppose that a particular computing service provided by cloud computing providers 610 is used by multiple users from managed network 300. It may be of interest for CSN cloud integration application 620 to obtain license subscription information related to each of these users so as to gain greater context into the usage of the particular computing service (e.g., to ascertain if the particular computing service is being under-utilized by users from managed network 300, to ascertain if the particular computing service is being over-utilized by users from managed network 300, etc.). Thus, CSN cloud integration application 620 may first obtain a list of all users and then may use this list as input to obtain license subscription information related to each user.

Graph 800 is provided to illustrate this concept. Get users integration point 810 is at the top of graph 800. This integration point allows CSN cloud integration application 620 to obtain a list of all users. As discussed above, the list of all users may be divided into one or more pages, which are represented on graph 800 as user list 812, user list 814 and user list 816. Put differently, user lists 812, 814, and 816 may each contain a sub-list of individual users from the list of all users.

To save on space complexity, CSN cloud integration application 620 may operate on graph 800 in accordance with a depth-first search (DFS). That is, CSN cloud integration application 620 may retrieve the user lists 812 without concurrently retrieving user list 814 or user list 816. Then, CSN cloud integration application 620 may loop through user list 812 to retrieve license subscription information for each user in user list 812. This is represented on graph 800 by get all licenses 818 and get all licenses 820.

After the license subscription information for each user in user list 812 is received, CSN cloud integration application 620 may retrieve user list 814 and may loop through user list 814 to retrieve license subscription information for each user in user list 814. This is represented on graph 800 by get all licenses 822 and get all license 824.

After the license subscription information for each user in user list 814 is received, CSN cloud integration application 620 may retrieve user list 816 and may loop through user list 816 to retrieve the license subscription information for each user in user list 816. CSN cloud integration application 620 may continue to repeat this process until the license subscription information for all users is retrieved.

Figure 9:
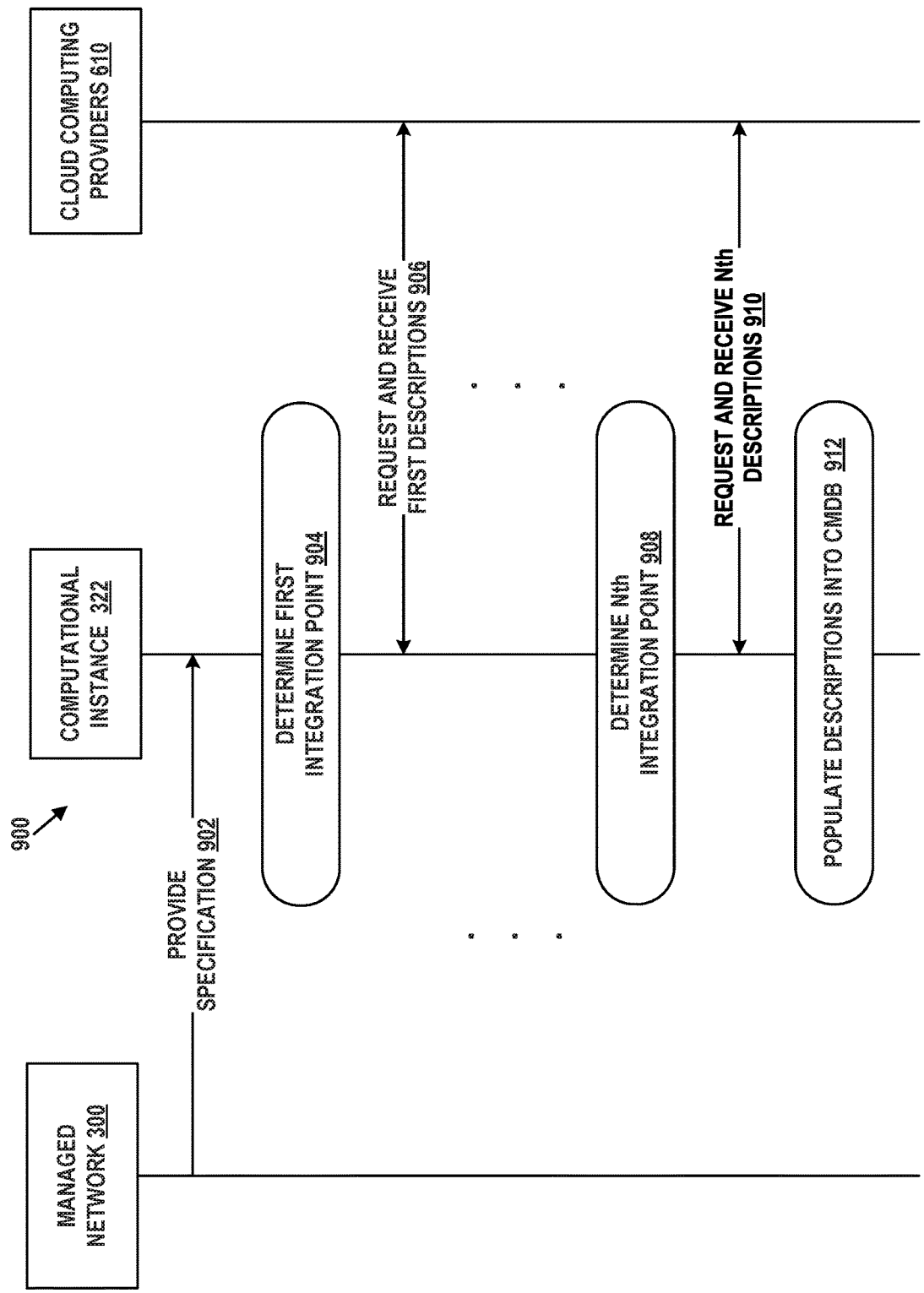
FIG. 9 depicts a message flow, in accordance with example embodiments.

FIG. 9 depicts message flow 900, in accordance with example embodiments. In message flow 900, computational instance 322 receives a specification from managed network 300 and then uses the specification to determine one or more integration points. By way of example, message flow 900 may utilize computational instance 322, managed network 300, and cloud computing providers 610 during operation. However, additional components, steps, or blocks, may be added to message flow 900.

At step 902, a user from managed network 300 may provide specification 630 to computational instance 322. Specification 630 may define: (i) one or more integration points offered by cloud computing providers 610, (ii) a pagination type associated with responses provided by the one or more integration points, and (iii) mappings between descriptions of the computing services provided by cloud computing providers 610 that appear in the responses and fields of the database tables in CMDB 500. Specification 630 may be transmitted from managed network 300 to computational instance 322 by way of a graphical interface.

At step 904, computational instance 322 invokes CSN cloud integration application 620. Upon invocation, CSN cloud integration application 620 may gather data from specification 630 to (i) authenticate with cloud computing providers 610 and (ii) determine a first integration point offered by cloud computing providers 610. As an example, a first integration point for a computing service provided by the cloud computing provider "FOOBAR" may take the form of https://foobar.com/api/v2?link=1."

At step 906, CSN cloud integration application 620 may request, using the first integration point determined in step 904, first descriptions of the computing service provided by cloud computing providers 610. In some cases, the request from computational instance 322 to cloud computing provider 610 may be facilitated via proxy servers 312 on managed network 300. The response received by CSN cloud integration application 620 from cloud computing providers 610 may include first descriptions of computing resources available to or used by managed network 300. In example embodiments, the first descriptions may be in XML, JSON, or YAML format.

As shown in FIG. 9, the steps of 904 and 906 may repeat for any number of integration points. As described above in FIG. 7, the subsequent integration points may be determined by a pagination type provide in specification 630. For example, at step 908, CSN cloud integration application 620 determines integration point N. This integration point may take the form of https://foobar.com/api/v2?link=n". At step 910, CSN cloud integration application 620 may request and receive Nth descriptions of computing resources from cloud computing providers 610 via integration point N.

At step 912, CSN cloud integration application 620 may organize the received descriptions from each of the N integration points and store the descriptions as configuration items in CMDB 500 or another database.

VI. EXAMPLE CONFIGURATION INTERFACES

To enable message flow 900, remote network management platform 320 may prompt a user from managed network 300 to enter the appropriate data for specification 630. This may be accomplished by way of a web page or series of web pages hosted by computational instance 322 and provided to the user from managed network 300 upon request. Notably, the following examples of web pages are merely for purposes of illustration and not intended to be limiting. Other web pages including alternative arrangements of information may exist.

Figure 10A:
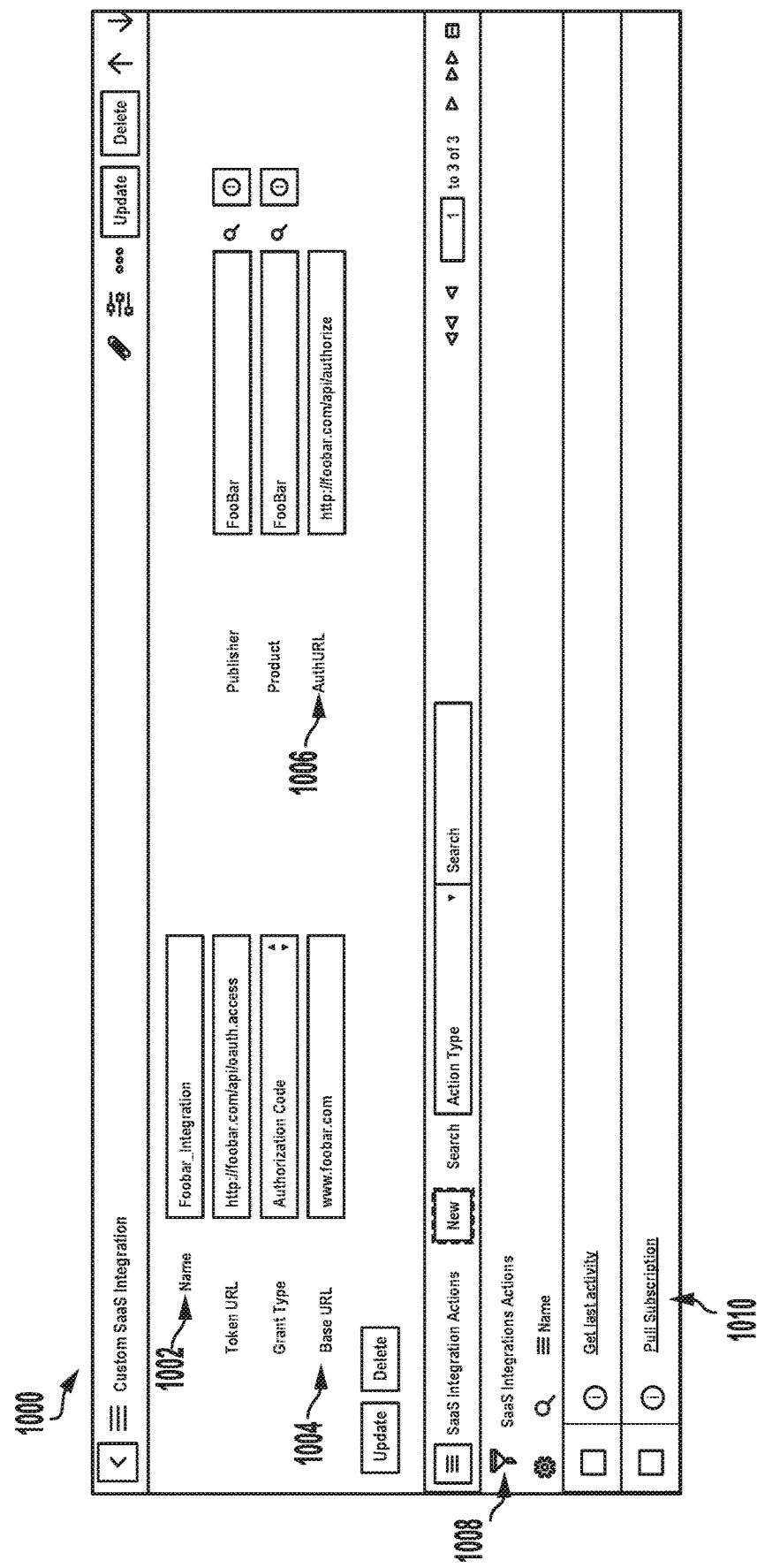
FIGS. 10A-10D depict web pages, in accordance with example embodiments.

FIG. 10A illustrates web page 1000, in accordance with example embodiments.

Web page 1000 facilitates the identification, configuration, and management of a particular computing service by allowing a user to specify configuration details related to the particular computing service. Details configured via web page 1000 may be included in specification 630.

Name field 1002 may allow users to assign a unique name to the particular computing service. This unique name may then be used to differentiate the particular computing service from other computing services.

Base URL field 1004 allows users to specify a base URL for the particular computing service. The base URL may include the scheme and host (or just the host) for the particular computing service. As described above in FIG. 7, CSN cloud integration application 620 may use different pagination types to modify this base URL and obtain different integration points.

Authentication URL 1006 may allow users to specify an authentication URL for the cloud computing provider the provides the particular computing service. During execution, CSN cloud integration application 620 may retrieve authentication information, package the authentication information into an API request, and transmit the API request to the authentication URL in order to authenticate with the particular cloud provider.

Integration actions list 1008 may include a list of integration actions that CSN cloud integration application 620 can perform to receive descriptions related to the particular computing service. As illustrated in FIG. 10A, integration actions list 1008 contains a "get last activity" action, which may operate to obtain the most recent activity for the particular computing service. In examples, the most recent activity may include details related to which users most recently accessed the particular computing service.

Integration actions list 1008 also contains pull subscription action 1010, which may operate to obtain subscription information from the particular computing service. In examples, subscription information may contain details related to the number of accounts that managed network 300 has with the particular computing service, the number of licenses that managed network 300 has with on the particular computing service, and so on.

A user may further configure each integration action from integration actions list 1008. For example, if the user clicks on or otherwise selects pull subscription action 1010, the user may be directed to a configuration page that enables the user to edit the configuration details for pull subscription action 1010.

Figure 10B:
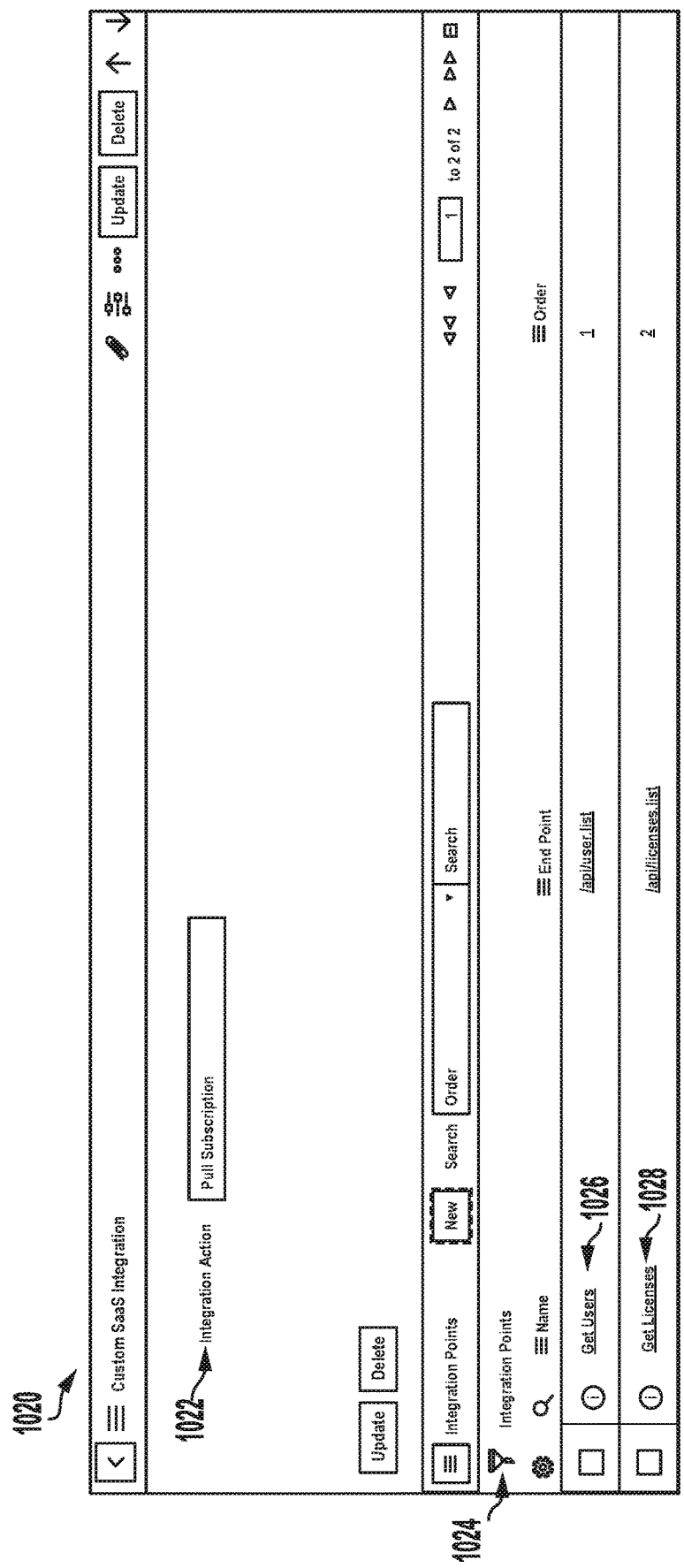

FIG. 10B illustrates web page 1020, in accordance with example embodiments. Web page 1020 facilitates the configuration a particular integration action by allowing a user to specify details related to the particular integration action. In example embodiments, web page 1020 may be provided to the user from managed network 300 upon clicking on or otherwise selecting an integration action from integration actions list 1008. Details configured via web page 1020 may be included in specification 630.

Integration name field 1022 may allow users to assign a unique name to the particular integration action being configured via web page 1020. This unique name may be used to differentiate the particular integration action from other integration actions.

Figure 8:
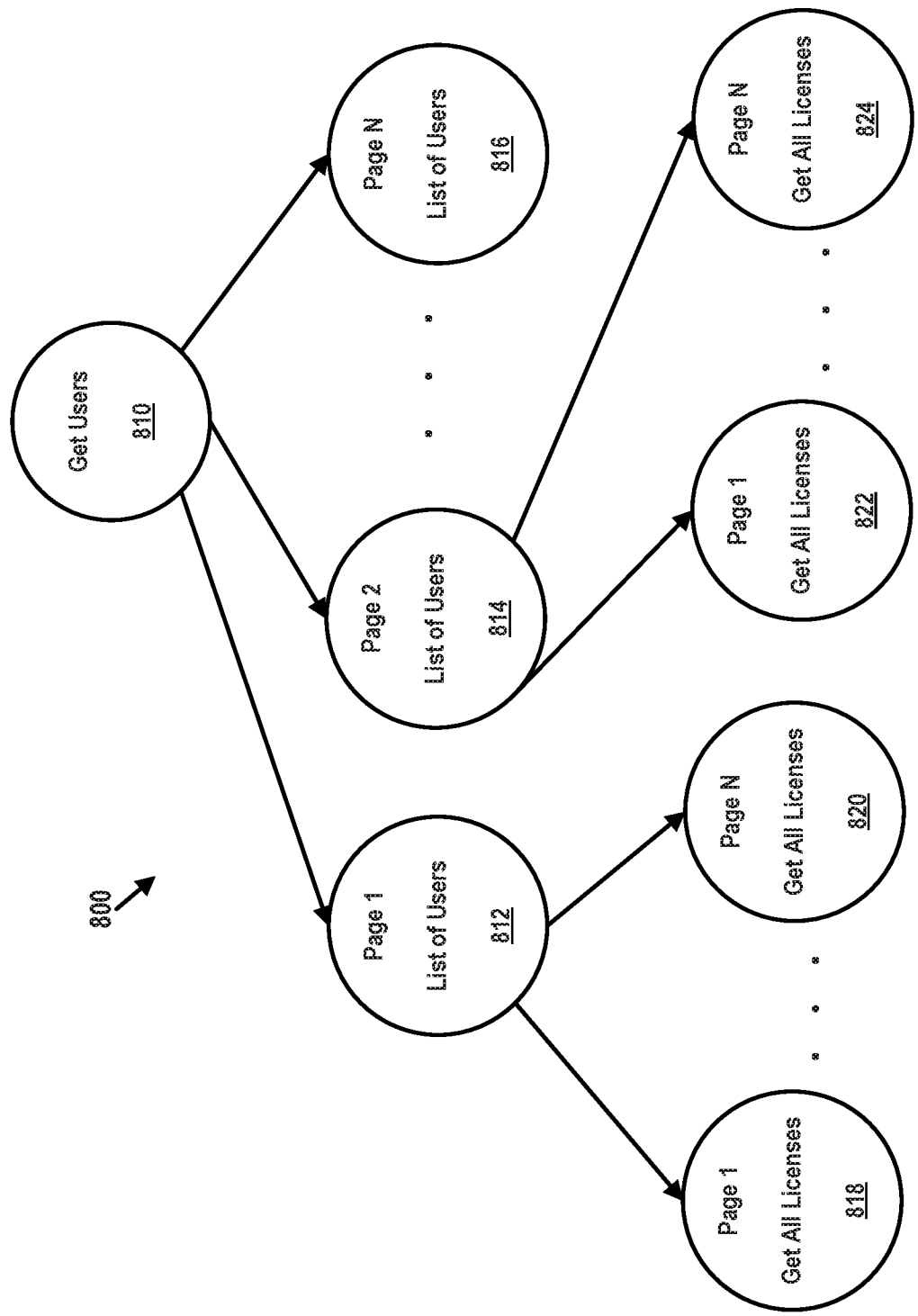
FIG. 8 depicts a graph, in accordance with example embodiments.

Integration point list 1024 includes a list of all integration points that CSN cloud integration application 620 should query when executing the particular integration action. Integration point list 1024 may allow users to configure a logical order for when each integration point will be queried. As described in FIG. 8, this allows descriptions received from a first integration point to be input into one or more subsequent integration points. For example, users integration point 1026 is shown as first in the order and license integration point 1028 is shown as second in the order.

A user may further configure each integration point from integration point list 1024. For example, if the user clicks on or otherwise selects users integration point 1026, the user may be directed to a configuration page that enables the user to edit the configuration details for users integration point 1026.

Figure 10C:
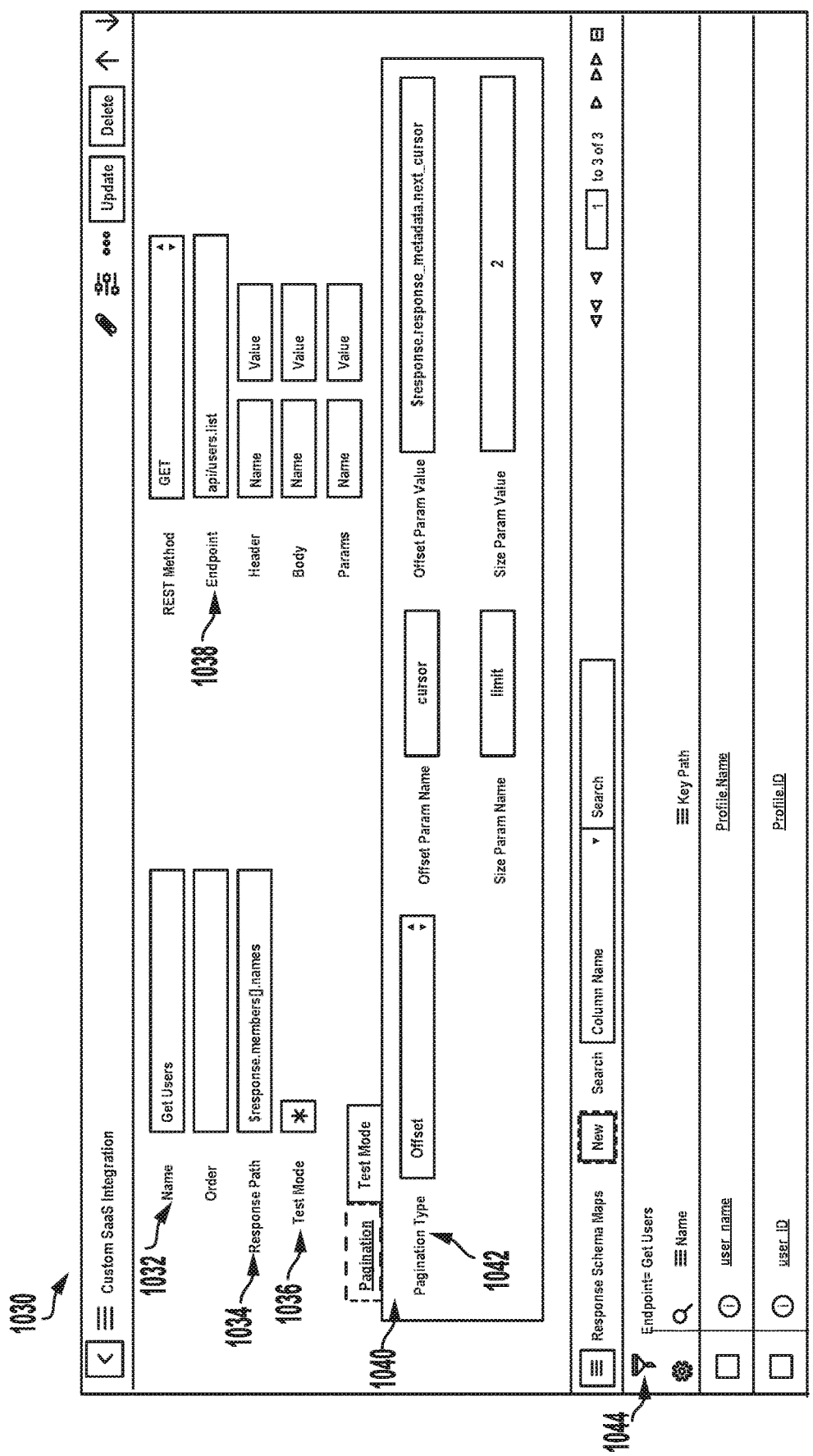

FIG. 10C illustrates web page 1030, in accordance with example embodiments. Web page 1030 facilitates the configuration a particular integration point by allowing a user to specify details related to the particular integration point. In example embodiments, web page 1030 may be provided to the user from managed network 300 upon clicking on or otherwise selecting an integration point from integration point list 1024. Details configured via web page 1030 may be included in specification 630.

Name field 1032 may allow users to assign a unique name to the integration point being configured via web page 1030. This unique name may be used to differentiate the particular integration point from other integration points.

In some cases, descriptions of computing services received from cloud computing providers 610 may contain extraneous information that managed network 300 does not want to store. To acquire only relevant data, response path 1034 may be used. Response path 1034 may include a concatenation of the nested objects and/or arrays that may locate a specific element within the received descriptions. Using such paths can be advantageous when parsing the descriptions, because not all elements may be of interest and paths can be used to define the elements that are of interest. For example, a description of a computing services may appear in the following JSON format:

```
{
    members: [
        {
            "key": 1,
            "names": {
                "User_name: "Jill",
                "ID":123
            }
        },
        {
            "key": 2,
            "names": {
                "User_name: "John",
                "ID":124
            }
        }
    ]
}
```

If "name" objects are relevant to the managed network 300, response path 1034 may include a structured path to the name "objects". This path may appear as the following: "response.members[ ].names". During operations, CSN cloud integration application 620 may utilize response path 1034 to extract values from descriptions and write them to a file and/or a database table.

Test mode flag 1036 may be a checkbox indicating whether the particular integration point defined via web page 1030 is being used for a test. Being used for a test (e.g., test mode flag 1036 is checked) means that CSN cloud integration application 630 displays descriptions received from cloud computing providers 610 for the user to view. In some cases, being used for a test means that the CSN cloud integration application 620 does not store any descriptions received from cloud computing providers 610 into CMDB 500. More on the test mode is described in the discussion of FIG. 10D below.

Endpoint 1038 may allow users to specify the API endpoint/URL for the particular integration point defined via web page 1030. Endpoint 1038 may correspond to an initial/first integration point.

Pagination box 1040 allows users to configure a pagination type to be used for endpoint 1038. As shown in FIG. 10C, pagination box 1040 includes pagination type dropdown 1042, which allows users to select one out of multiple pagination types. Web page 1030 shows that the "offset" pagination type is currently selected. This results in "offset param name", "offset param value", "size param name" and "size param value" fields being shown in pagination box 1040. The user may populate these field to configure the "offset" pagination type.

Response schema maps 1044 allow users to map descriptions of the computing services received from cloud computing providers 610 to tables/fields in CMDB 500. For example, response schema maps 1044 shows that a "user_name" field is mapped to a "name" field within a "profile" table of CMDB 500. Further, response schema maps 1044 shows that an "user_ID" field is mapped to a "ID" field within a "profile" table of CMDB 500. Notably, other mappings are also possible.

Figure 10D:
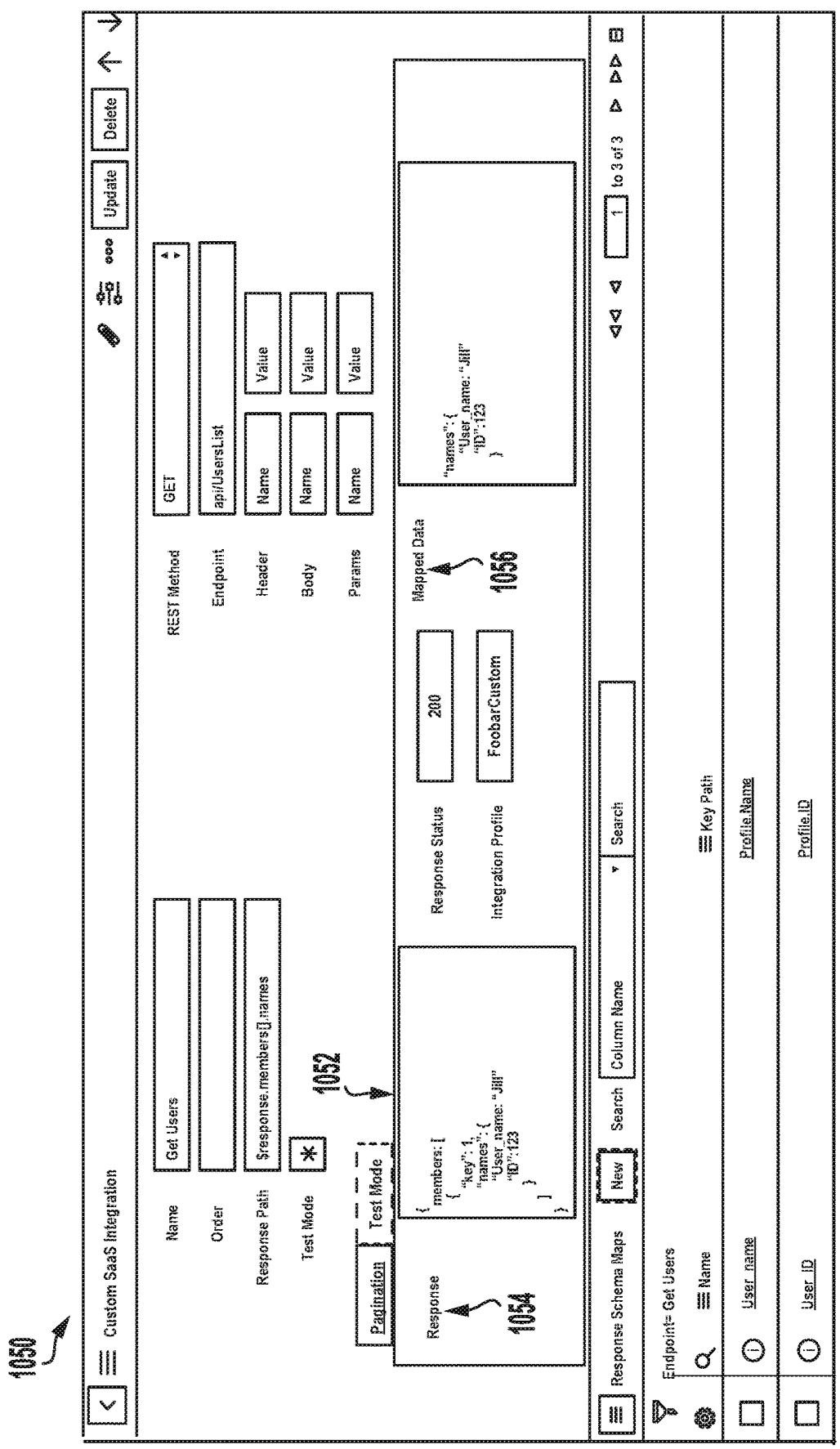

FIG. 10D illustrates a web page 1050, in accordance with example embodiments. Web page 1050 generally contains the same content as web page 1030, with the exception of test box 1052, which is shown in FIG. 10D to be activated (perhaps via a user clicking or otherwise selecting the "Test Mode" button). Thus, for the purposes of brevity, the descriptions of items that overlap with web page 1030 are omitted from web page 1050.

In FIG. 10D, response field 1054 shows a sample response/description of a computing resource that may be received from cloud computing providers 610 upon querying endpoint 1038. In turn, mapped data field 1056 may show a mapping of the sample response. In particular, the mapping shown in mapped data field 1056 may correspond to path provided in response path 1034.

Advantageously, showing response field 1054/mapped data field 1056 may assist users with properly mapping the response received from cloud computing providers 610 into field/tables in CMDB 500 (e.g., help users with properly configuring response path 1034/response schema maps 1044).

VII. EXAMPLE OPERATIONS

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves obtaining, by a computing-service-neutral cloud integration application, a specification related to a remote network. The computing-service-neutral cloud integration application can be executable on one or more processors disposed within a computational instance. The computational instance may be dedicated to a managed network, and persistent storage disposed within the computational instance contains, in database tables, representations of computing services provided by remote networks. The specification may define: (i) an integration point for the remote network, (ii) a pagination type associated with responses provided by the integration point, and (iii) mappings between descriptions of the computing services provided by the remote network that appear in the responses and fields of the database tables.

Block 1110 involves requesting and receiving, by the computing-service-neutral cloud integration application and via the integration point, first descriptions of the computing services provided by the remote network.

Block 1120 involves determining, by the computing-service-neutral cloud integration application and from the pagination type and the integration point, a second integration point for the remote network.

Block 1130 involves requesting and receiving, by the computing-service-neutral cloud integration application and via the second integration point, second descriptions of the computing services provided by the remote network.

Block 1140 involves storing, by the computing-service-neutral cloud integration application and in the fields of the database tables, the first descriptions and the second descriptions in accordance with the mappings.

Some embodiments involve determining, by the computing-service-neutral cloud integration application and from the pagination type and the second integration point, a third integration point for the remote network. The embodiments may further involve requesting and receiving, by the computing-service-neutral cloud integration application and via the third integration point, third descriptions of the computing services provided by the remote network. The embodiments may further involve storing, by the computing-service-neutral cloud integration application and in the fields of the database tables, the third descriptions in accordance with the mappings.

Some embodiments involve obtaining a second specification related to a second remote network, where the second specification defines: (i) a third integration point for the second remote network, (ii) a second pagination type associated with second responses provided by the third integration point, and (iii) second mappings between descriptions of second computing services provided by the second remote network that appear in the second responses and fields of the database tables. The embodiments may further involve requesting and receiving, via the third integration point, third descriptions of the computing services provided by the second remote network. The embodiments may further involve determining, from the pagination type and the third integration point, a fourth integration point for the second remote network. The embodiments may further involve requesting and receiving, via the fourth integration point, fourth descriptions of the computing services provided by the second remote network. The embodiments may further involve storing, in the fields of the database tables, the third descriptions and the fourth descriptions in accordance with the second mappings.

In some embodiments, the remote network is physically distinct from the computing system and the managed network, and the computing system and the managed network access the remote network by way of a wide-area network.

In some embodiments, the specification also defines an authentication mechanism for the remote network, and requesting and receiving the first descriptions of the computing services provided by the remote network comprises requesting and receiving the first descriptions by way of the authentication mechanism.

In some embodiments, the integration point comprises a URL, the URL including a host associated with the remote network and a path. In these embodiments, the pagination type comprises a next endpoint pagination that specifies a new path and the second integration point comprises a second URL, the second URL including the host associated with the remote network and the new path.

In some embodiments, the integration point comprises a URL, the URL including a host associated with the remote network, a path, and a query string. In these embodiments the pagination type comprises a next link pagination that specifies a new query string and the second integration point comprises a second URL, the second URL including the host associated with the remote network, the path, and the new query string.

In some embodiments, the new query string comprises a key value pair that is determined based on information within the first descriptions of the computing services provided by the remote network.

In some embodiments, the integration point comprises a URL, the URL including a host associated with the remote network, a path, and a query string that contains an offset parameter and a size parameter. In these embodiments the pagination type comprises an offset pagination that specifies a new query string, the new query string containing a second offset parameter and the size parameter and the second integration point comprises a second URL, the second URL including the host associated with the remote network, the path, and the new query string.

In some embodiments, the integration point comprises a URL, the URL including a host associated with the remote network, a path, and a query string that contains a page parameter. In these embodiments the pagination type comprises a page-based pagination that specifies a new query string, the new query string containing a second page parameter, and the second integration point comprises a second URL, the second URL including the host associated with the remote network, the path, and the new query string.

In some embodiments, the descriptions of the computing services provided by the remote network are received by the computing-service-neutral cloud integration application as a complex data object. In these embodiments the specification further defines paths within the complex data object in which particular descriptions of the computing services provided by the remote network are located and storing descriptions of the computing services comprises storing descriptions of the computing services with reference to the paths.

In some embodiments, the complex data object is formatted in accordance with JSON or XML.

In some embodiments, the specification further defines a test option and the computing-service-neutral cloud integration application, prior to the storing, performs further operations including: determining that the test option is activated and based on the test option being activated, (i) generating one or more graphical user interfaces with elements corresponding to the first descriptions and the second descriptions, and (ii) providing, to a client device associated with the managed network, the one or more graphical user interfaces.

In some embodiments, the first descriptions of the computing services comprise an array of descriptions and requesting and receiving the second descriptions of the computing services comprises, for each respective description in the array of descriptions, modifying the second integration point with a parameter provided in the respective description and requesting and receiving, via the second integration point as modified, a subset of the second descriptions.

In some embodiments, the subset of the second descriptions comprises a second array of descriptions and the computing-service-neutral cloud integration application performs further operations including: determining, from the pagination type and the second integration point, a third integration point for the remote network and requesting and receiving, via the third integration point, third descriptions of the computing services provided by the remote network. In these embodiments, requesting and receiving the third descriptions comprises: for each respective description in the second array of descriptions, modifying the third integration point with a parameter provided in the respective description and requesting and receiving, via the third integration point as modified, a subset of the third descriptions.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a computational instance including persistent storage, the persistent storage containing, in database tables, representations of computing services provided by remote networks, wherein the computational instance is dedicated to a managed network; and
   one or more processors disposed within the computational instance and configured to cause a computing-service-neutral cloud integration application to perform operations including:
      generating a graphical user interface (GUI) having user interface elements that correspond to a specification of a remote network, wherein the specification comprises: (i) an integration point for the remote network, (ii) a pagination type associated with responses provided by the integration point, and (iii) mappings between descriptions of the computing services provided by the remote network that appear in the responses and fields of the database tables;
      providing the GUI to a client device of the managed network;
      receiving the specification of the remote network from the client device via the GUI;
      requesting and receiving, from the integration point, first descriptions of the computing services provided by the remote network;
      determining, from the pagination type and the integration point, a second integration point for the remote network;
      requesting and receiving, from the second integration point, second descriptions of the computing services provided by the remote network; and
      storing, in the fields of the database tables, the first descriptions and the second descriptions in accordance with the mappings.

2. The computing system of claim 1, wherein the computing-service-neutral cloud integration application performs further operations including:
   determining, from the pagination type and the second integration point, a third integration point for the remote network;
   requesting and receiving, from the third integration point, third descriptions of the computing services provided by the remote network; and
   storing, in the fields of the database tables, the third descriptions in accordance with the mappings.

3. The computing system of claim 1, wherein the computing-service-neutral cloud integration application performs further operations including:
   obtaining a second specification related to a second remote network, wherein the second specification defines: (i) a third integration point for the second remote network, (ii) a second pagination type associated with second responses provided by the third integration point, and (iii) second mappings between descriptions of second computing services provided by the second remote network that appear in the second responses and fields of the database tables;
   requesting and receiving, from the third integration point, third descriptions of the computing services provided by the second remote network;
   determining, from the pagination type and the third integration point, a fourth integration point for the second remote network;
   requesting and receiving, from the fourth integration point, fourth descriptions of the computing services provided by the second remote network; and
   storing, in the fields of the database tables, the third descriptions and the fourth descriptions in accordance with the second mappings.

4. The computing system of claim 1, wherein the remote network is physically distinct from the computing system and the managed network, and wherein the computing system and the managed network access the remote network by way of a wide-area network.

5. The computing system of claim 1, wherein the specification also defines authentication credentials to access the remote network, and wherein requesting and receiving the first descriptions of the computing services provided by the remote network comprises:
   authenticating with the remote network using the authentication credentials.

6. The computing system of claim 1, wherein the integration point comprises a uniform resource locator (URL), the URL including a host associated with the remote network and a path, wherein the pagination type comprises a next endpoint pagination that specifies a new path, and wherein the second integration point comprises a second URL, the second URL including the host associated with the remote network and the new path.

7. The computing system of claim 1, wherein the integration point comprises a uniform resource locator (URL), the URL including a host associated with the remote network, a path, and a query string, wherein the pagination type comprises a next link pagination that specifies a new query string, wherein the second integration point comprises a second URL, the second URL including the host associated with the remote network, the path, and the new query string, and wherein the new query string comprises a key value pair that is determined based on information within the first descriptions of the computing services provided by the remote network.

8. The computing system of claim 1, wherein the integration point comprises a uniform resource locator (URL), the URL including a host associated with the remote network, a path, and a query string that contains an offset parameter and a size parameter, wherein the pagination type comprises an offset pagination that specifies a new query string, the new query string containing a second offset parameter and the size parameter, and wherein the second integration point comprises a second URL, the second URL including the host associated with the remote network, the path, and the new query string.

9. The computing system of claim 1, wherein the integration point comprises a uniform resource locator (URL), the URL including a host associated with the remote network, a path, and a query string that contains a page parameter, wherein the pagination type comprises a page-based pagination that specifies a new query string, the new query string containing a second page parameter, and wherein the second integration point comprises a second URL, the second URL including the host associated with the remote network, the path, and the new query string.

10. The computing system of claim 1, wherein the descriptions of the computing services provided by the remote network are received by the computing-service-neutral cloud integration application as a complex data object, wherein the specification further defines paths within the complex data object in which particular descriptions of the computing services provided by the remote network are located, wherein storing descriptions of the computing services comprises storing descriptions of the computing services with reference to the paths, and wherein the complex data object is formatted in accordance with JavaScript Object Notation (JSON) or eXtensible Markup Language (XML).

11. The computing system of claim 1, wherein the specification further defines a test option, and wherein, prior to the storing, the computing-service-neutral cloud integration application performs further operations including:
 determining that the test option is activated; and
 based on the test option being activated, (i) generating an updated GUI that includes additional user interface elements corresponding to the first descriptions and the second descriptions, and (ii) providing the updated GUI to the client device.

12. The computing system of claim 1, wherein the first descriptions of the computing services comprise an array of descriptions, and wherein requesting and receiving the second descriptions of the computing services comprises:
 for each respective description in the array of descriptions:
 modifying the second integration point with a parameter provided in the respective description, and
 requesting and receiving, from the second integration point as modified, a subset of the second descriptions.

13. The computing system of claim 12, wherein the subset of the second descriptions comprises a second array of descriptions, and wherein the computing-service-neutral cloud integration application performs further operations including:
 determining, from the pagination type and the second integration point, a third integration point for the remote network,
 requesting and receiving, from the third integration point, third descriptions of the computing services provided by the remote network, wherein requesting and receiving the third descriptions comprises:
 for each respective description in the second array of descriptions:
 modifying the third integration point with a parameter provided in the respective description, and
 requesting and receiving, from the third integration point as modified, a subset of the third descriptions.

14. The computing system of claim 1, wherein the integration point is a uniform resource locator (URL) that refers to an application programming interface (API) hosted by the remote network, and wherein, to request and receive the first descriptions, the computing-service-neutral cloud integration application performs operations including:
 requesting and receiving, via a network connection to the remote network, the first descriptions from the API hosted by the remote network using the URL.

15. A computer-implemented method comprising:
 generating, by a computing-service-neutral cloud integration application of a computational instance, a graphical user interface (GUI) and providing the GUI to a client device of a managed network;
 receiving, by the computing-service-neutral cloud integration application and from the client device, a specification related to a remote network via the GUI, wherein the specification defines: (i) an integration point for the remote network, (ii) a pagination type associated with responses provided by the integration point, and (iii) mappings between descriptions of the computing services provided by the remote network that appear in the responses and fields of database tables;
 requesting and receiving, by the computing-service-neutral cloud integration application and from the integration point, first descriptions of computing services provided by the remote network;
 determining, by the computing-service-neutral cloud integration application and from the pagination type and the integration point, a second integration point for the remote network;
 requesting and receiving, by the computing-service-neutral cloud integration application and from the second integration point, second descriptions of the computing services provided by the remote network; and
 storing, by the computing-service-neutral cloud integration application and in the fields of the database tables, the first descriptions and the second descriptions in accordance with the mappings.

16. The computer-implemented of claim 15, wherein the integration point comprises a uniform resource locator (URL), the URL including a host associated with the remote network, a path, and a query string, where the pagination type comprises a next link pagination that specifies a new query string, and wherein the second integration point comprises a second URL, the second URL including the host associated with the remote network, the path, and the new query string.

17. The computer-implemented of claim 15, wherein the first descriptions of the computing services comprise an array of descriptions, and wherein requesting and receiving the second descriptions of the computing services comprises:
 for each respective description in the array of descriptions:
 modifying the second integration point with a parameter provided in the respective description, and
 requesting and receiving, from the second integration point as modified, a subset of the second descriptions.

18. The computer-implemented of claim 15, further comprising:
 determining, by the computing-service-neutral cloud integration application and from the pagination type and the second integration point, a third integration point for the remote network;
 requesting and receiving, by the computing-service-neutral cloud integration application and from the third integration point, third descriptions of the computing services provided by the remote network; and
 storing, by the computing-service-neutral cloud integration application and in the fields of the database tables, the third descriptions in accordance with the mappings.

19. An article of manufacture including a non-transitory computer-readable medium, having stored thereon program instructions that, upon execution by one or more processors disposed within a computational instance, cause the one or more processors to perform operations comprising:

generating, by a computing-service-neutral cloud integration application of the computational instance, a graphical user interface (GUI) and providing the GUI to a client device of a managed network;

receiving, by the computing-service-neutral cloud integration application and from the client device, a specification related to a remote network via the GUI, wherein the specification defines: (i) an integration point for the remote network, (ii) a pagination type associated with responses provided by the integration point, and (iii) mappings between descriptions of the computing services provided by the remote network that appear in the responses and fields of the database tables;

requesting and receiving, by the computing-service-neutral cloud integration application and from the integration point, first descriptions of the computing services provided by the remote network;

determining, by the computing-service-neutral cloud integration application and from the pagination type and the integration point, a second integration point for the remote network;

requesting and receiving, by the computing-service-neutral cloud integration application and from the second integration point, second descriptions of the computing services provided by the remote network; and storing, by the computing-service-neutral cloud integration application and in the fields of the database tables, the first descriptions and the second descriptions in accordance with the mappings.

20. The computing system of claim 14, wherein the second integration point is a second URL that refers to a second API hosted by the remote network, and wherein, to request and receive the second descriptions, the computing-service-neutral cloud integration application performs operations including:

requesting and receiving, via the network connection to the remote network, the second descriptions from the second API hosted by the remote network using the second URL.

* * * * *